J. G. BLESSING.
IMPULSE TRANSMITTING DEVICE.
APPLICATION FILED JULY 31, 1913.
1,145,544.
Patented July 6, 1915.
5 SHEETS—SHEET 1.
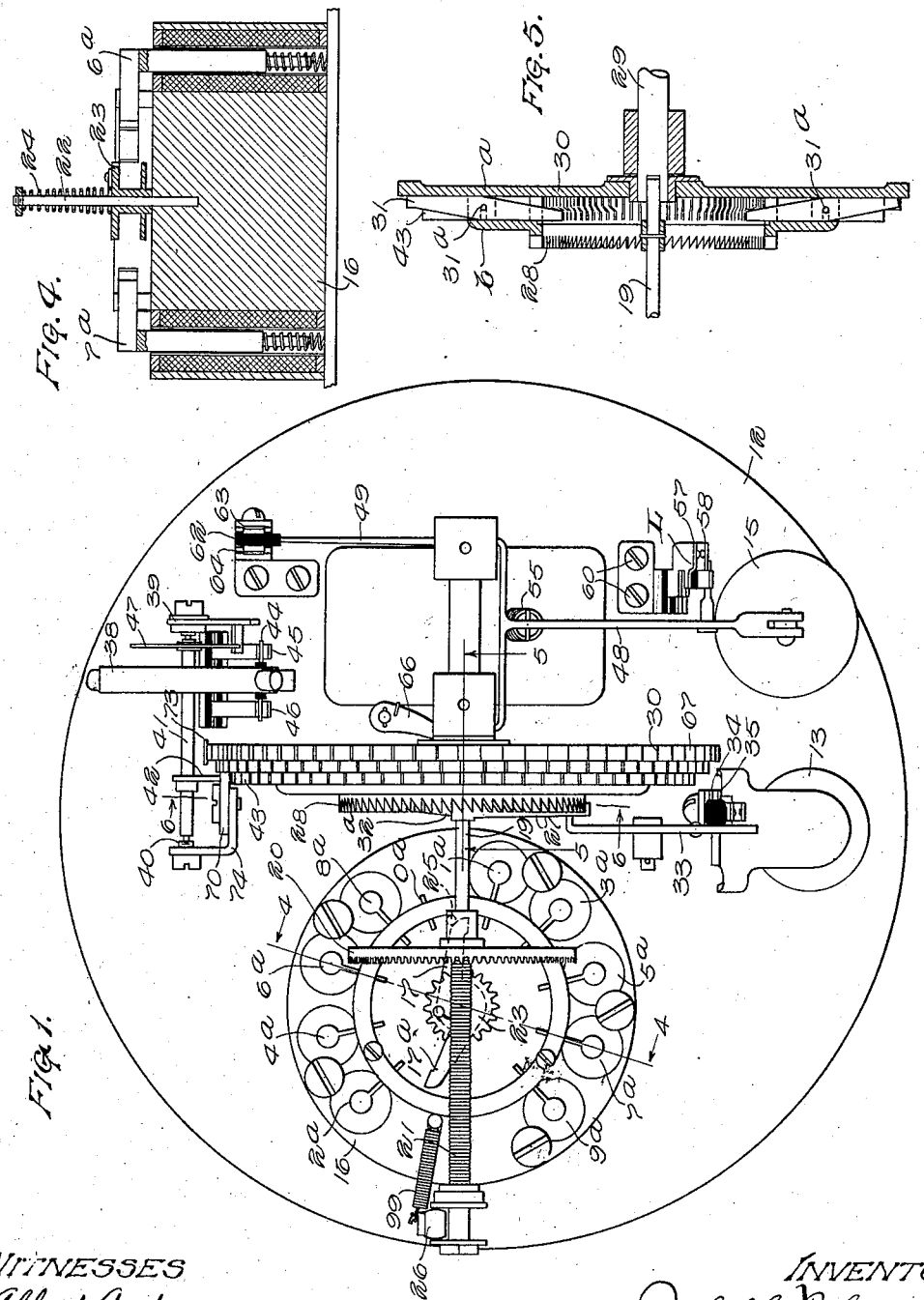
WITNESSES
Albert Andersen.
G. Yanochowski.
INVENTOR:
John G. Blessing
By Bulkley & Svenston
ATTORNEYS.

J. G. BLESSING.
IMPULSE TRANSMITTING DEVICE.
APPLICATION FILED JULY 31, 1913.
1,145,544.
Patented July 6, 1915.
5 SHEETS—SHEET 2.
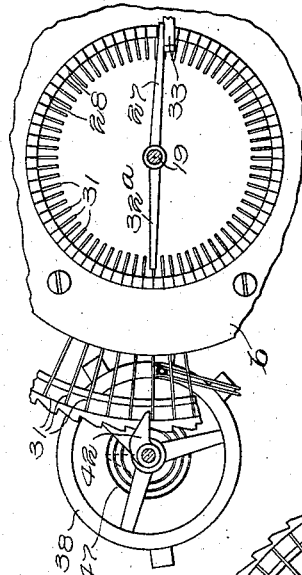
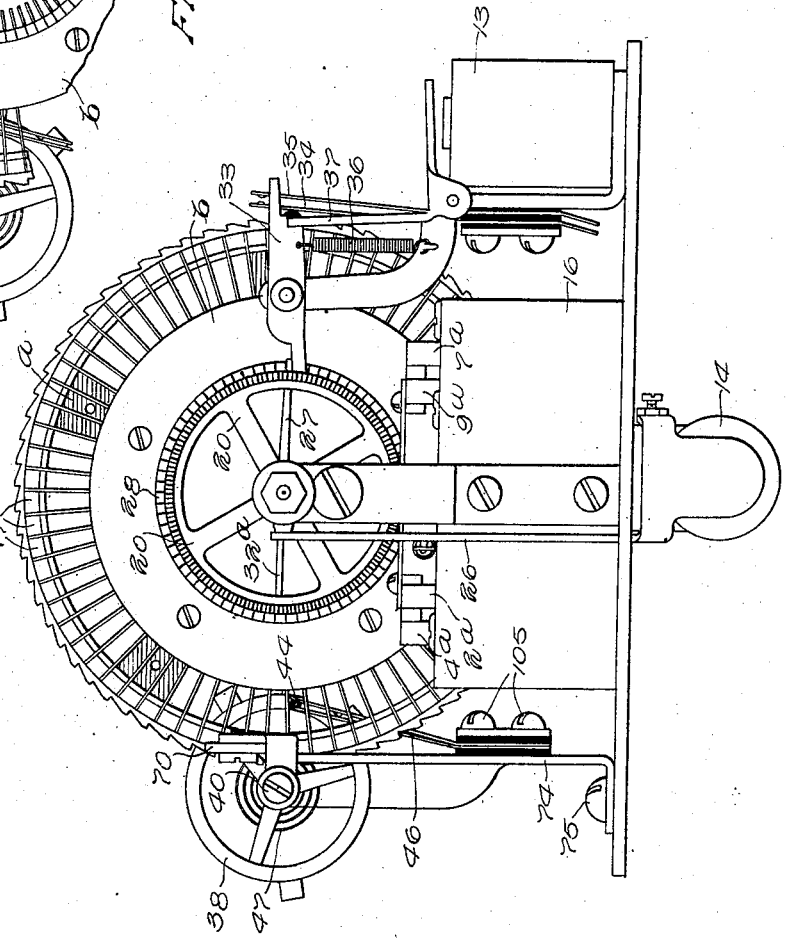

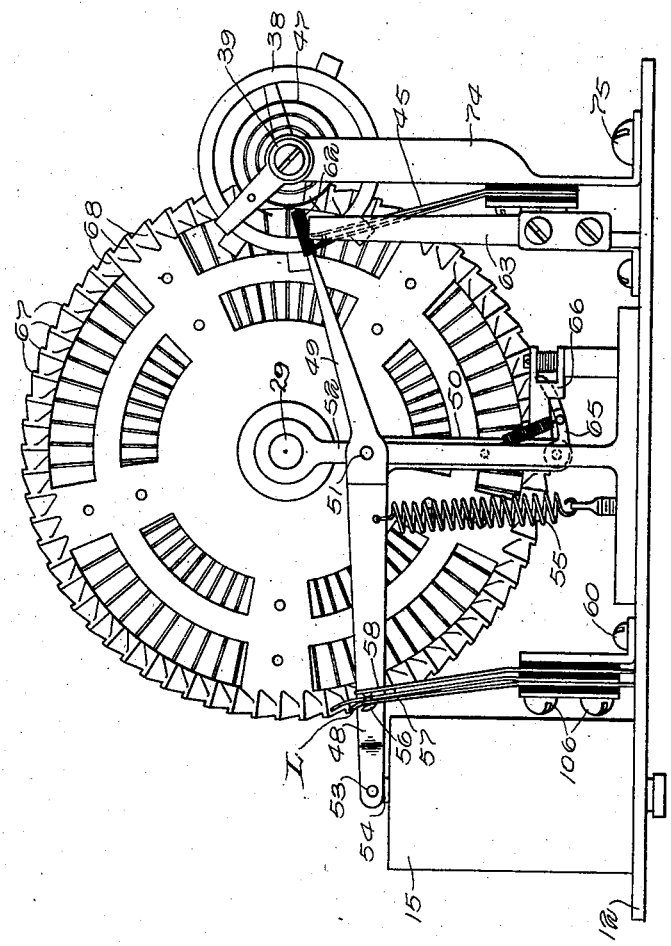

J. G. BLESSING.
IMPULSE TRANSMITTING DEVICE.
APPLICATION FILED JULY 31, 1913.

1,145,544.

Patented July 6, 1915.
5 SHEETS—SHEET 4.

WITNESSES
Albert Anderson.
G. Yanochowski.

INVENTOR:
John G. Blessing
By Bulkley Swenarton
ATTORNEYS.

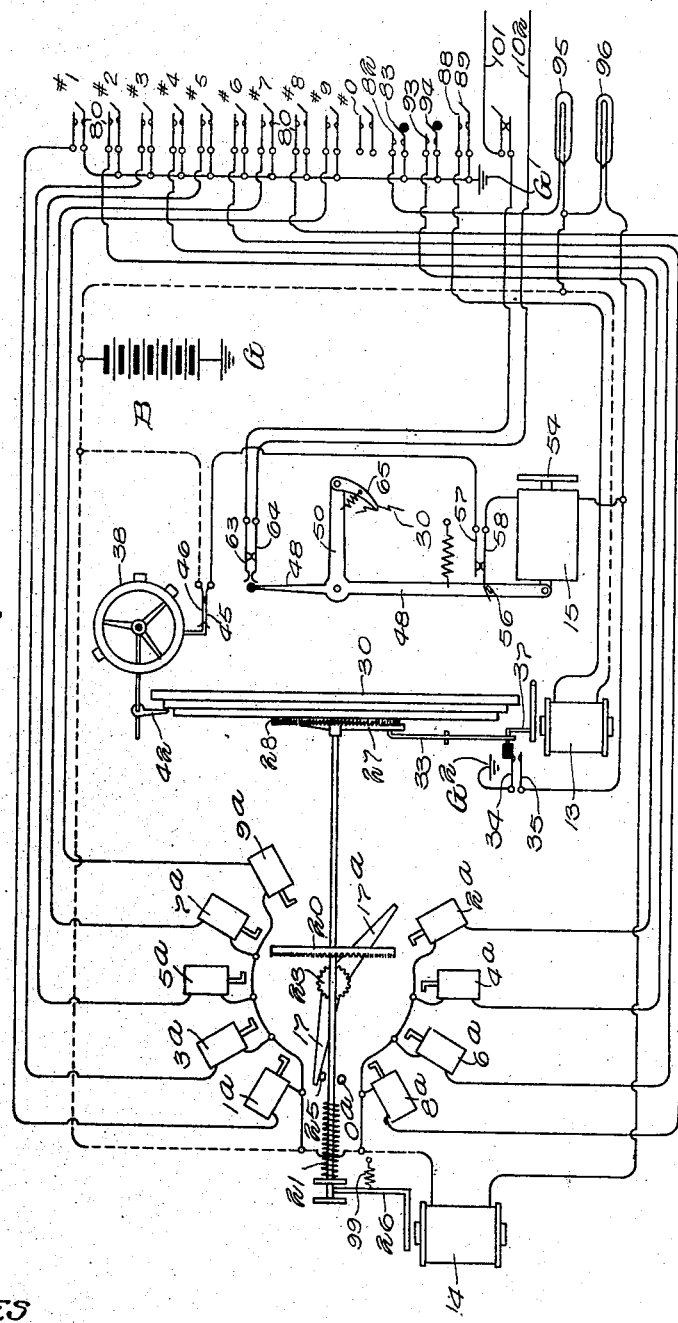

UNITED STATES PATENT OFFICE.

JOHN G. BLESSING, OF CHICAGO, ILLINOIS, ASSIGNOR TO AUTOMATIC ELECTRIC COMPANY, OF CHICAGO, ILLINOIS, A CORPORATION OF ILLINOIS.

IMPULSE-TRANSMITTING DEVICE.

1,145,544.  Specification of Letters Patent.  Patented July 6, 1915.

Application filed July 31, 1913. Serial No. 782,204.

*To all whom it may concern:*

Be it known that I, JOHN G. BLESSING, a citizen of the United States of America, and resident of Chicago, Cook county, Illinois, have invented certain new and useful Improvements in Impulse-Transmitting Devices, of which the following is a specification.

My invention relates to improvements in automatic impulse-transmitting devices, and relates particularly to an impulse-transmitting device for use in connection with automatic telephone systems in which a plurality of groups of impulses are transmitted over a line circuit for the purpose of operating automatic switches.

Among the objects of my invention are to provide an improved construction of such impulse-transmitting devices and to provide a simplified structure in which one or more keys are first operated to set up the apparatus, and then the apparatus is set in motion to transmit a plurality of groups of impulses.

My invention is in the nature of an improvement upon the transmitting device shown in my previous application Serial No. 740,953, filed January 9th, 1913. In the transmitting device of this application, however, I have provided improved operating means and also improved means for producing a pause between each series of impulses. In this manner I provide an impulse-transmitting device in which the separate series of impulses are separated by a distinct pause and these series of impulses are thus particularly adapted for operating the switches in an automatic telephone system, in which it is particularly important that there be a distinct pause between each series of impulses to insure the proper operation of the switches.

These and other objects of my invention will be more readily understood by having reference to the accompanying drawings, in which I have illustrated one embodiment of my invention.

Figure 9:
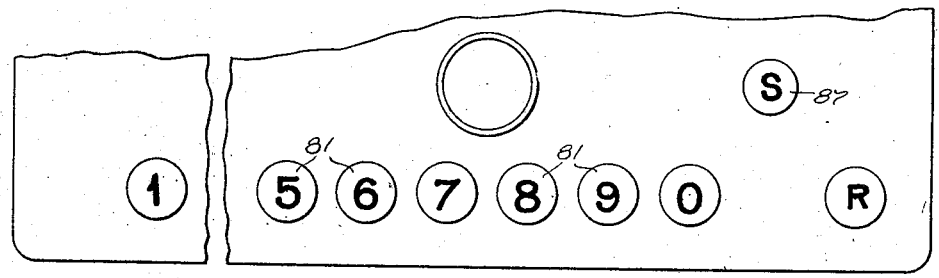
Figure 8:
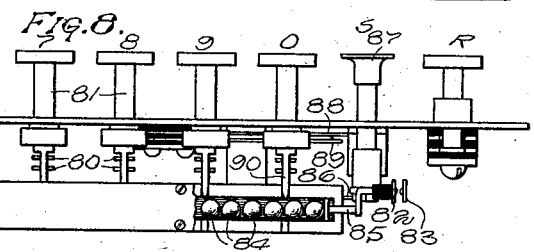
Figure 7:
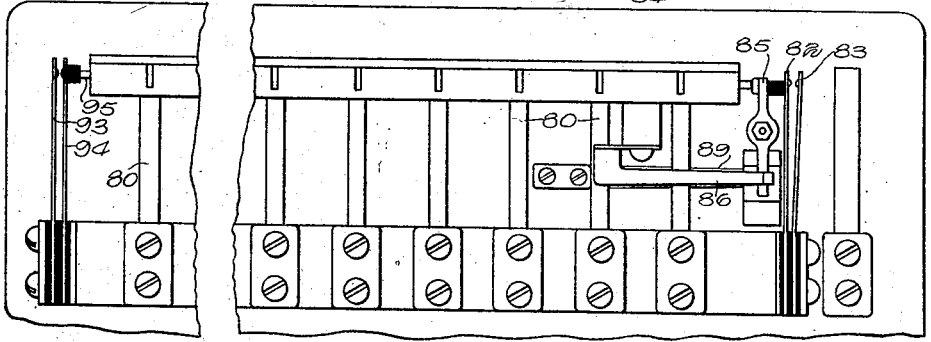

In the drawings—Figure 1 represents the mechanical construction of the apparatus embodying the principles of my invention. Fig. 2 is a left end elevation of the same. Fig. 3 is an end elevation of the same as seen from the right end. Fig. 4 is a sectional view on the line 4—4 of Fig. 1. Fig. 5 is a sectional view of a part of the apparatus, taken along the line 5—5 of Fig. 1. Fig. 6 is a sectional view along the line 6—6 of Fig. 1 with certain parts removed. Figs. 7, 8 and 9 represent springs and push buttons for the initiation of the call. Fig. 10 shows diagrammatically the circuits of the calling device.

Referring to Fig. 1 there is mounted on a suitable base plate 12 electromagnets 13 and 14 (14 being mounted on the under side of plate 12, as shown in Fig. 2), a self interrupting motor driving device 15, hereinafter to be described, and a dial arrangement 16 provided with a pair of arms 17 and 17$^a$, which are secured to a spindle passing through the center of said dial. These arms are arranged to rotate at a given time on the dial 16 until stopped by one of the plunger arms of the solenoids 1$^a$—9$^a$ (Fig. 10) or the tenth stop 0$^a$. The solenoids are situated beneath said dial, and are energized in accordance with the digits called. The tenth stop 0$^a$ for the arm 17$^a$ is permanently fastened to the dial, for it is not necessary that it should move out of the path of the arms 17 and 17$^a$, as they never rotate past it. Therefore, a tenth solenoid is not necessary. For the purpose of rotating the arms 17 and 17$^a$ there is provided a rotatable shaft 19, on which is secured a gear wheel 20 fastened to a spiral spring 21, the spring tending to rotate the shaft 19 in a counter clockwise direction viewed from left to right (Figs. 1 and 10). A gear wheel 23 is secured to a spindle 22, upon which the arms 17 and 17$^a$ are mounted, and a spiral spring 24 is secured to said gear wheel, retaining the arm 17 normally against the stop 25 (see Figs. 1 and 4). Therefore, it will be seen that immediately upon the energization of magnet 14, its armature 26 operates to move the gear wheel 20 to the left (Fig. 1) and into mesh with the gear wheel 23, to impart motion to the wipers 17 and 17$^a$, in a clockwise direction (Fig. 10). Normally the shaft 19 is held in position against the tension of spring 21 by the arm 27 attached to said shaft and which engages the circular series of teeth 28.

Attached to a shaft 29 (Fig. 5) there is a wheel 30, shown in section to illustrate the manner of assembling the same. A number of levers 31 are pivoted (as at 31$^a$) between the plates a and b of the wheel 30, and midway between the circumference and center, the ends of which levers are clearly shown in Fig. 6. The inner ends of these levers are situated in a circle just inside of the circle of teeth 28, and are arranged to be tilted by a shorter arm 32ª, best shown in Fig. 6, mounted on the shaft 19 diametrically opposed to the arm 27.

Associated with the magnet 13 (see Fig. 2), which we will call the start magnet, is a lever 33, together with two contact springs 34 and 35, the function of which is to close the circuit of the motor solenoid 15, upon the energization of said magnet 13. Normally the lever 33 is locked in the position shown by the arm 37 being in engagement with said lever, and the contact between the springs 34 and 35 is normally open. When a call is initiated, the energization of the magnet 13 removes the arm 37 from engagement with the lever 33, so that said lever moves, under the influence of the spring 36, in such a manner as to keep the contacts of the springs 34 and 35 closed until the arm 27 is rotated back with the wheel 30 to its normal position, at which time the arm 27 again engages the inner end of the lever 33, to return the lever to its normal position and to open the contact between the springs 34 and 35. On the opposite side of the wheel 30 to that on which the magnet 13 is situated, a balance wheel 38 is mounted in the bearings 39 and 40, held by a stud 74 secured to the base plate 12 by means of screws 75. Fastened to the shaft 41 (see Fig. 1) upon which the balance wheel 38 is mounted is a cam 42, said cam being adapted to be engaged by the levers 31 that are projected out upon the circumference 43 of the wheel 30, said engagement taking place as said wheel 30 rotates the projecting levers 31 past the said cam 42. A pin 44 is mounted in the rim of the balance wheel 38 but insulated therefrom, and normally engages the springs 45 and 46, (which are secured to the stud 74 by means of screws 105, see Fig. 2), said pin and springs completing a circuit through the motor solenoid 15, when the contact between springs 34 and 35 is closed. When one of the levers 31 engages the cam 42, the balance wheel 38 is kicked or rotated in a counter clockwise direction (Fig. 1), causing the circuit of the motor solenoid to be opened for a certain predetermined period of time. A retractile spring 47 then returns the balance wheel 38 to normal position and thus the circuit of the motor solenoid 15 is again completed. This delay or pause in the action of the motor solenoid consequently separates the impulses being transmitted into series of impulses, which allows the switches at the central office time to operate. A roller 70 is secured to the stud 74 and rolls on the surface 71 of the wheel 30. The purpose of said roller is to restore the levers 31 to their normal positions, as they are carried past the said roller by rotation of the wheel 30. A spring 73 is also mounted upon the stud 74 and engages the outer circumference of the wheel 30 in such a manner as to allow the wheel 30 to be rotated in a clockwise direction only.

Referring to Fig. 3, a device consisting of three arms, namely 48, 49 and 50 is pivoted at the point 51 to the stud 52. The arm 48 is also pivoted to the plunger 54 of the motor solenoid 15, a spring 55 retaining the arms in their normal position. An interrupter device L is secured to the base plate 12 by screws 60 and is controlled by a pin 56 carried by the arm 48. This device operates in such a manner as to keep closed the contact between the springs 57 and 58 while solenoid 15 is being energized, and then to open the contacts 57 and 58, thus opening the circuit of the solenoid 15, and to hold said circuit open until said solenoid has completely deënergized. The action of solenoid 15 causes the insulated tip 62 of the arm 49 to open and close contact between springs 63 and 64 (Fig. 1), thus operating to send impulses of current over the line circuit. At the end of arm 50 is pivoted a pawl 65, which engages the teeth 67 on the outer circumference of the wheel 30, causing it to be rotated in a counter clockwise direction (Fig. 3) one step every time the motor solenoid 15 is operated. A pawl 66 normally engages the teeth 68 on the side of the wheel 30 for the purpose of allowing the pawl 65 to step the wheel 30 only one step at a time.

A section of the keyboard, together with the assembly of the contact springs to close the necessary circuits in initiating a call is shown in Figs. 7, 8 and 9. Fig. 7 is a view of the under side of the keyboard showing the contact springs 80, which are arranged in pairs. The ends of these springs are shown in Fig. 8 and are pressed together when their corresponding key 81 is depressed. The springs 82, 83, 93 and 94 are closed by the depression of any one of the keys 81 in the following manner: Upon the depression of one of the keys 81 a projection 90 attached to said key is forced between two steel balls (Fig. 8), forcing them apart and acting on rods 85 and 95. The rod 95 forcing together springs 93 and 94 every time that any one of the keys 81 is pressed, while the lever 85 forces together the springs 82 and 83. These springs remain locked in their operated position by means of a detent arrangement on the end of the spring 86 (Fig. 7) until the start key 87 is depressed, when it moves said spring 86 out of engagement with the lever 85, which lever releases and allows the contact springs 82 and 83 to separate. At the same time the start key 87 closes the circuit of the relay 13 by pressing together the contact springs 88 and 89.

Having given a description of the component parts of my invention, I will now describe the operation and circuits of the mechanism while a connection is being established.

We will assume that the operator wishes to signal a station whose number is six hundred and seventy eight. She, therefore, depresses the keys 6, 7 and 8 in quick succession, each one returning to its normal position immediately upon the removal of her finger, due to the tension of the contact springs 80, which are momentarily pressed together. Upon the digit key 6 being depressed three circuits are closed, one through the corresponding stop solenoid $6^a$ (Fig. 10), from ground G' through springs of the key 6 and said stop solenoid to the battery B, and through battery back to ground, another from ground G' through the springs 93 and 94 to the shifting magnet 14, through said magnet and to battery B, and the third circuit from ground G' through the contact springs 82 and 83 and through the supervisory lamp 95 to battery. The latter circuit is a supervisory circuit, and is to indicate that one or more of the calling keys have been depressed, but not the start key S (Fig. 9), for we have already seen that when this start key S is depressed, the contact springs 82 and 83 are released. The magnet 14 and the solenoid $6^a$ are energized practically simultaneously. The former operates to bring the wheel 20 into mesh with the wheel 23, and at the same time to clear the arm 27 from engagement with the teeth 28, leaving the wheels 20 and 23 free to be swung around by means of action of spring 21 until one of the arms (in this case arm $17^a$) is stopped by the plunger arm of the solenoid $6^a$, the arm being drawn down flush with the face of the dial 16. It will be seen, of course, that the arm 27, upon being freed from the teeth 22 also rotates with the shaft 19. This arm is carried over as many teeth as are indicated by the digit just called, and upon the deënergization of the magnet 14, recedes back under the influence of the spring 99 (Fig. 1) to its newly found position. The shaft 19 is prevented from being further rotated under the influence of spring 21 when out of engagement with the gear 23, because the cam 27 again engages the teeth 28 just before the gear wheel 20 breaks away from gear wheel 23. When the shaft 19 reaches its normal position, the arms 17 and $17^a$ spin back under the influence of the spiral spring 24, as has been explained heretofore. There is also an arm $32^a$ secured to the shaft 19, which is made to engage with the inner ends of the levers 31, so as to tilt the outer ends forward onto the circumference 43 of the wheel 30 (Figs. 1 and 6). Each time the magnet 14 energizes to operate the shaft 19, the smaller arm $32^a$ is rotated in the same manner as the larger arm 27 and is the means of causing a new projection to appear on the circumference 43 of the wheel 30, by tilting forward another one of the levers 31 when the shaft 19 slides back to its normal position. When the operator depresses the keys 6—7—8 in succession, three of these levers 31 are tilted, causing three projections to be made on the circumference 43 of the wheel 30, said projections being separated by a distance corresponding to the digits called. For example, upon depressing the key 6 the arms 27 and $32^a$ are swung around six places in a manner heretofore explained, and the arm 27 is then carried by the shaft 19 into engagement with the teeth 28, opposite which the arm 27 has been rotated. At the same time, arm $32^a$ is rotated past five of the levers 31 and is then carried into engagement with the inner end of the sixth lever, causing its outer end to be tilted forward on the circumference 43. In like manner, when the button 7 is pressed the arm $32^a$ passes over six more levers and then presses in upon the inner end of the seventh lever from the one last depressed. When the button 8 is depressed, the arm 32 passes over seven more levers and presses in upon the end of the eighth lever, as before described.

After depressing the calling keys 6—7—8 in succession, the operator depresses the start key 87, which releases the contact springs 82 and 83 (Figs. 7 and 8), and presses together the contact springs 88 and 89, whereupon a circuit is closed from ground G' (Fig. 10) through the springs 88 and 89, through relay 13 to battery B. Upon the relay 13 energizing, a circuit is closed through the motor solenoid 15, which extends from ground $G^2$, through springs 34 and 35, through solenoid 15, springs 58 and 57, springs 45 and 46 to battery B. A circuit is also closed from $G^2$ through springs 34 and 35, through the lamp 96 to battery B, the glow of the lamp signaling the operator that the impulse device has started to operate. The motor solenoid, upon energizing and deënergizing, separates the springs 63 and 64 a number of times, in accordance with the digit called (in this instance it being 6), and sends impulses over the lines 101 and 102 to the central exchange. At the same time, the pawl 65 operates to rotate the wheel 30 in a clockwise direction, that is, in a direction to rotate the arm 27 back to normal position. Since the arm 32 was moved six places away from its normal resting place, i. e., opposite the cam 42, by the depression of the first, or number 6 button, and as each division represents one impulse, it will be seen that 1?

six impulses will be transmitted before the projecting lever 31 will engage the cam 42 and rotate the balance wheel 38 in a counter clockwise direction, which as heretofore explained, opens the circuit of the motor solenoid, until the balance wheel has again attained its normal position and again closed the circuit of the motor solenoid 15 by means of the springs 45 and 46, and the pin 44. The balance wheel 38 having returned to normal, the motor solenoid again operates to transmit impulses, and to rotate the wheel 30 until seven more impulses are transmitted in response to the second digit, when another lever 31 will again engage cam 42 and forces the balance wheel 38 to operate. After a short interval the impulse device is again started and transmits eight more impulses, this being the third series, at the end of which the arm 27 will have rotated back to its normal position and comes into contact with the lever 33, at which time said lever is tilted to release the springs 34 and 35, thus breaking the circuit of the motor solenoid 15 and causing the lamp 96 to cease glowing. Each of the operated levers 31 are forced back to their normal position by coming into contact with the roller 70 during the rotation of the wheel 30.

It will thus be seen that I have devised a very efficient impulse-transmitting device, in which the impulse springs are controlled directly by a solenoid magnet, and in which a distinct and definite pause is provided between series of impulses by means of the operation of the balance wheel.

While I have illustrated one embodiment of my invention, and one particularly adapted for use in connection with automatic telephone systems, it will, of course, be understood that my invention is of broader scope, and is adapted to be used in connection with any signaling system in which a series of impulses are to be transmitted in this manner. Various modifications and changes in the mechanical structure will likewise readily suggest themselves to those skilled in the art and come within the contemplated scope of my invention.

What I claim as my invention is:

1. An impulse-transmitting device comprising a pair of contacts, an interrupter magnet for operating said contacts to transmit impulses, and automatically controlled means for automatically opening the circuit of said magnet to thereby divide said impulses into a plurality of groups.

2. An impulse-transmitting device comprising a pair of contacts, a magnet, an operating circuit therefor, means controlled by the operation of said magnet for operating said contacts and for interrupting said operating circuit to thereby cause the intermittent operation of said magnet, and independent means for automatically opening said operating circuit for an interval of time to thereby divide said impulses into groups.

3. An impulse-transmitting device, comprising a pair of contacts, a magnet, an operating circuit therefor, means controlled by the operation of said magnet for operating said contacts and for interrupting said operating circuit to thereby cause the intermittent operation of said magnet, and variably adjustable independent means for automatically opening said operating circuit for an interval of time to thereby divide said impulses into groups.

4. An impulse-transmitting device comprising a pair of contacts, a magnet, an operating circuit therefor, means controlled by the operation of said magnet for operating said contacts and for interrupting said operating circuit to thereby cause the intermittent operation of said magnet, a balance wheel, variably adjustable means for partially rotating said wheel, and means controlled by the rotation of said wheel for opening said operating circuit for an interval of time to thereby divide said impulses into a plurality of groups.

5. An impulse-transmitting device comprising a pair of contacts, a solenoid magnet having a plunger core for intermittently operating the said contacts, a movable controlling member, and means for variably adjusting said member whereby said contacts may be operated to transmit a plurality of series of impulses.

6. An impulse-transmitting device comprising a pair of contact springs, a solenoid magnet having a plunger core for intermittently operating said contacts, a controlling member carrying a plurality of actuating devices held normally in inoperative position, means for moving certain of said devices into operative position, and means for then setting said controlling member in motion, whereby said springs are operated to transmit a plurality of series of impulses.

7. An impulse-transmitting device comprising a pair of contact springs, a solenoid magnet having a plunger core for intermittently operating said contacts, and a movable controlling mechanism carrying a plurality of adjustable devices for automatically interrupting the circuit of said solenoid magnet for an interval of time to thereby cause said contact springs to be given a plurality of series of operations.

8. An impulse-transmitting device comprising a pair of contact springs, a magnet for intermittently operating said contacts, a movable controlling mechanism carrying a plurality of adjustable devices, a balance wheel controlled by said adjustable devices, and means controlled by said balance wheel for interrupting the circuit of said magnet for an interval of time to thereby cause said contact springs to be given a plurality of series of operations.

9. An impulse-transmitting device comprising a pair of contact springs, a magnet, an operating circuit therefor, means controlled by the operation of said magnet for operating said contacts and for interrupting said operating circuit, a controlling mechanism adapted to be moved at a predetermined speed, adjustable arms carried by said controlling mechanism, means for operating certain of said arms, and means controlled by said arms when in an operated position for interrupting the circuit of said magnet for an interval of time to thereby divide said impulses into groups.

10. An impulse-transmitting device comprising a pair of contact springs, a magnet, an operating circuit therefor, means controlled by the operation of said magnet for operating said contacts and for interrupting said operating circuit, a controlling mechanism adapted to be moved at a predetermined speed, adjustable arms carried by said controlling mechanism, means for operating certain of said arms, a balance wheel, means controlled by said arms when in operated position for operating said balance wheel, and means controlled by the operation of said balance wheel for interrupting the circuit of said magnet for an interval of time to thereby divide said impulses into groups.

11. In an impulse-transmitting device, a set of contact springs, a magnet, an operating circuit therefor, means controlled by the operation of said magnet for operating said contacts and for interrupting said operating circuit, a controlling mechanism comprising a rotary member carrying a plurality of arms, and means controlled by said arms for opening the circuit of said magnet for an interval of time to thereby divide the impulses into groups.

12. In an impulse-transmitting device, a set of contact springs, a magnet, an operating circuit therefor, means controlled by the operation of said magnet for operating said contacts and for interrupting said operating circuit, a controlling mechanism comprising a rotary member carrying a plurality of arms, a balance wheel controlled by said arms, and means controlled by the operation of said balance wheel for opening the circuit of said magnet for an interval of time to thereby divide said impulses into groups.

13. An impulse-transmitting device comprising a pair of contact springs, a magnet, an operating circuit therefor, means controlled by the operation of said magnet for operating said contacts and for interrupting said operating circuit to thereby intermittently operate said springs, means for controlling said operation, said controlling means consisting of a rotary member containing a plurality of adjustable arms, and means controlled by said arms for opening the circuit of said magnet for an interval of time.

14. An impulse-transmitting device comprising a pair of contact springs, a magnet, an operating circuit therefor, means controlled by the operation of said magnet for operating said contacts and for interrupting said operating circuits to thereby intermittently operate said springs, means for controlling said operation, said controlling means consisting of a rotary member containing a plurality of adjustable arms, a balance wheel controlled by said arms, and means controlled by the operation of said balance wheel for interrupting the circuit of said magnet for an interval of time.

15. An impulse-transmitting device comprising a pair of contacts, an interrupter magnet for operating said contacts to transmit impulses, and electrically controlled means for automatically opening the circuit of said magnet for a time interval to thereby divide said impulses into a plurality of groups.

16. An impulse-transmitting device comprising a pair of contacts, an interrupter for said contacts, means for operating said interrupter to transmit impulses via said contacts, and means for mechanically controlling said interrupter to space the impulses into groups, said mechanical means being in turn controlled by a mechanical slow acting device timed proportionately with the length of the spaces between the groups.

Signed by me at Chicago, Cook county, Illinois, this 24th day of July, 1913.

JOHN G. BLESSING.

Witnesses:
ALBERT ANDERSEN,
B. GARBER.

Copies of this patent may be obtained for five cents each, by addressing the "Commissioner of Patents, Washington, D. C."